United States Patent [19]

Sundholm

[11] Patent Number: 4,681,352
[45] Date of Patent: Jul. 21, 1987

[54] JOINT FOR A PIPE PROVIDED WITH A FLARED END

[75] Inventor: Göran Sundholm, Kauniainen, Finland

[73] Assignee: GS-Hydro Oy, Vantaa, Finland

[21] Appl. No.: 843,691

[22] PCT Filed: Mar. 29, 1985

[86] PCT No.: PCT/FI85/00031
§ 371 Date: Jan. 21, 1986
§ 102(e) Date: Jan. 21, 1986

[87] PCT Pub. No.: WO86/00383
PCT Pub. Date: Jan. 16, 1986

[30] Foreign Application Priority Data
Jun. 18, 1984 [FI] Finland ................ 842455

[51] Int. Cl.⁴ ............................. F16L 25/00
[52] U.S. Cl. ........................ 285/334.1; 285/334.5; 285/332.2; 285/382
[58] Field of Search ........... 285/334.1, 334.5, 334.2, 285/332.3, 332.2, 382

[56] References Cited

U.S. PATENT DOCUMENTS

| | | | |
|---|---|---|---|
| 48,709 | 7/1865 | Emory | 285/334.5 X |
| 2,032,720 | 3/1936 | Sander | 285/334.5 X |
| 2,289,382 | 7/1942 | Parker | 285/334.5 X |
| 2,362,686 | 11/1944 | De Lano | 285/334.5 X |
| 2,444,622 | 7/1948 | Wolfram | 285/334.5 X |

FOREIGN PATENT DOCUMENTS 686275 1/1953 United Kingdom ............ 285/334.5

Primary Examiner—Richard J. Scanlan, Jr.
Attorney, Agent, or Firm—Ladas & Parry

[57] ABSTRACT

The invention relates to a joint for a pipe provided with a flared end. An internal supporting surface (4) of a tightening flange (3) makes contact with the outside of the pipe flare (2), a supporting surface (6) of an insert piece (5) makes contact with the inside of said flare (2). In order to improve the grip of the pipe flare (2), the inside of the tightening flange is provided with a rounded shoulder (7) and the insert piece, correspondingly, with a notch (8), whereby deformation of the pipe material is achieved in adjustment according to the form of the shoulder (7) of the tightening flange.

6 Claims, 2 Drawing Figures

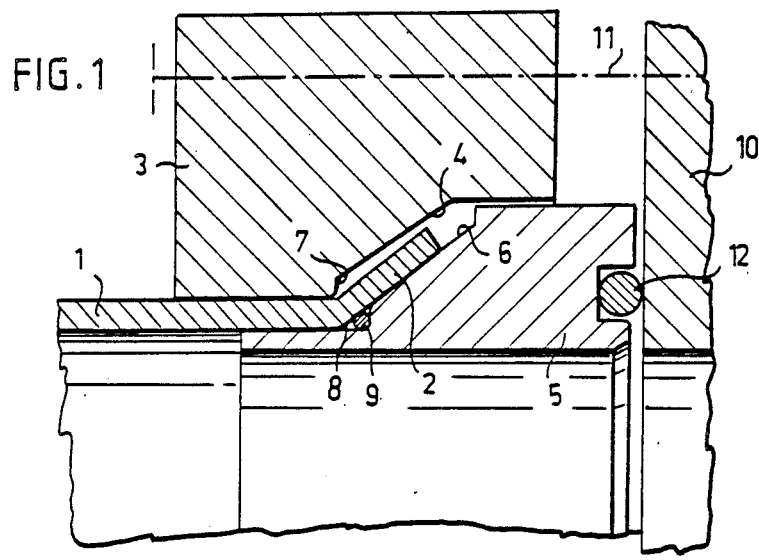
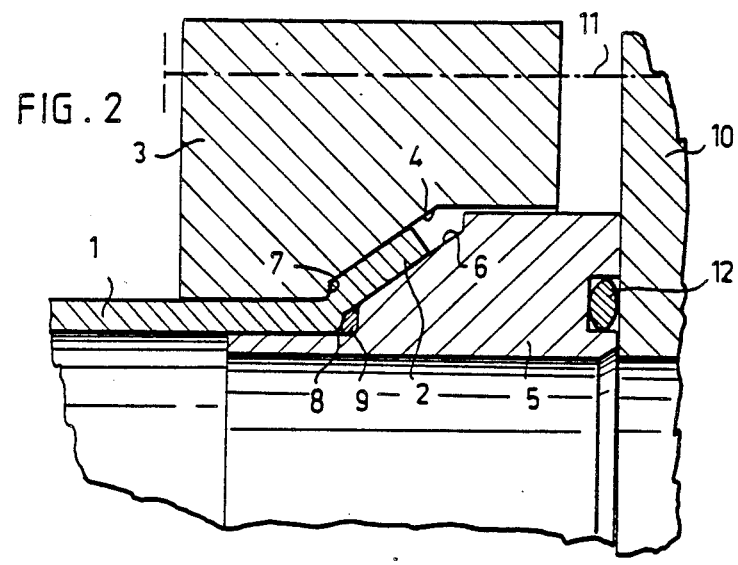

JOINT FOR A PIPE PROVIDED WITH A FLARED END

The present invention relates to a joint for a pipe provided with a flared end, comprising a tightening flange provided with an internal supporting surface for making contact with the outside of the flare, and an insert piece provided with an external supporting surface for making contact with the inside of said flare.

A serious problem with known joints of this type is that the flare, due to the pressure prevailing in the pipe, tends to slide out of the grip between the tightening flange and the insert piece. It is not possible to solve the problem only by increasing the tightening force of the tightening flange, because the insert piece begins to give in at a certain limit and is pressed together inwards, whereafter an increase, in the tightening force is of no use. Another reason for the tendency of the pipe flare to slide off is that when the flare is formed the material of the pipe is slightly thinned in a direction towards the outer end of the flare. It can be mentioned, by way of illustration, that if the inner surface of the flare forms an angle of 37° with respect to the axis of the pipe, the angle between the outer surface of the flare and the axis of the pipe is only about 33°.

The object of the invention is to provide a new joint which avoids said disadvantages.

The joint according to the invention is mainly characterized in that said internal supporting surface of the tightening flange is provided, in the radially inner end thereof, with a rounded shoulder for initiating contact with the outside of the flare at least essentially in the transition area between said flare and the axial portion of the pipe, when the tightening flange is tightened, and that the external supporting surface of the insert piece is provided, in the radially inner end thereof, with a notch for receiving the pipe material deformed by said shoulder of the tightening flange.

Said notch in the supporting surface of the insert piece is preferably sufficiently large to receive a sealing ring, too.

Thus, when tightening up the tightening flange, the flare is deformed, without cutting, in the transition between said flare and the axial portion of the pipe in such a manner that the outer surface of the flare is adjusted in shape according to the shoulder of the tightening flange, thus providing considerably improved holding properties.

The achieved improvement can be illustrated by means of the following performed test. A steel pipe (St 35) with an outer diameter of 140 mm and a wall thickness of 4.5 mm slid out of the grip between a tightening flange and an insert piece at a pressure of 195 bars, when the joint was of the conventional type. The joint now suggested maintained its grip up to a pressure of 310 bars, whereat the pipe broke. A better holding grip is not needed.

The invention will be described in the following in more detail with reference to the attached simplified drawing.

FIG. 1 illustrates a longitudinal section of the joint before the tightening of the tightening flange, FIG. 2 illustrates the joint in a tightened state.

The reference numeral 1 designates a pipe with an end flare 2. The numeral 3 designates a tightening flange provided with an internal conical supporting surface 4 which is intended to make contact with the outside of the pipe flare 2. The numeral 5 designates an insert piece provided with an external conical supporting surface 6 which is intended to make contact with the inside of the flare 2.

The novelty of the invention lies in that the supporting surface 4 of the tightening flange is provided, at the inner edge thereof facing the pipe, with a rounded shoulder 7, and in that a notch 8 is provided likewise at the inner end of the supporting surface 6 of the insert piece. When the tightening flange is tightened by means of tightening bolts, one such bolt being schematically indicated and designated 11 in the drawing, the rounded shoulder of the tightening flange deforms the pipe flare, without weakening it by cutting into it, so that the pipe material is adjusted according to the shape of the shoulder 7, whereby an efficient grip of the flare 2 is achieved. The notch 8 ensures that no cuttings are formed in the flare 2 by said shoulder by receiving the deformation of the pipe caused by the shoulder 7. A sealing ring 9 can advantageously be fitted in the notch 8 of the insert piece, although said ring is not always necessary. The reference numeral 10 designates schematically a stationary connection, such as a pump, but, instead of this, another tightening flange with an insert piece similar to said piece 5 is just as conceivable, without, however, such a frontal seal ring 12 as shown in the insert piece 5 in the drawing. Alternatively, also a so called double cone can be used as an insert piece.

Besides the considerably more secure grip of the pipe flare 2, also a more advantageous loading on the insert piece 5 is provided by means of the invention, on account of that a major part of the tightening force acts in the axial direction through the shoulder 7 of the tightening flange, while only part of the force acts perpendicularly on the conical surface 6, whereby the tendency to press together the insert piece is considerably reduced as compared with conventional joints.

I claim:

1. A joint for a pipe having a flared end comprising a tightening flange provided with an internal supporting surface for making contact with an outside of the flare, an insert piece having an external supporting surface for making contact with the inside of said flare, said internal supporting surface of the tightening flange having in the radially inner end thereof a substantially rounded shoulder for initiating contact with the outside of the flare at least in the transition area between said flare and the axial portion of the pipe when the tightening flange is tightened, the external supporting surface of the insert piece is provided in the radially inner end thereof with a notch for receiving the pipe material deformed by said shoulder of the tightening flange, a sealing ring being fitted in said notch of the insert piece.

2. A joint as claimed in claim 1 wherein said shoulder and said notch extend circumferentially around the tightening flange and the insert piece, respectively.

3. A joint as claimed in claim 1 wherein said insert piece has a tail portion extended from the radially inner end thereof for providing a better engagement between said insert piece and said pipe having a flared end.

4. A joint as claimed in claim 3 wherein said tail portion is positioned substantially parallel to a cylindrical portion of the pipe.

5. A joint as claimed in claim 1 wherein said insert piece has a guiding portion extending from said external supporting surface in the direction opposite to the direction of tightening the flange for guiding of said insert piece within the tightening flange.

6. A joint as claimed in claim 5 wherein the guiding portion has an outside cylindrical surface is substantially parallel to an inside cylindrical surface of the tightening flange.

* * * * *